United States Patent
Liu et al.

(10) Patent No.: US 8,031,414 B1
(45) Date of Patent: Oct. 4, 2011

(54) SINGLE LENS LASER BEAM SHAPER

(75) Inventors: Chuyu Liu, Newport News, VA (US);
Shukui Zhang, Yorktown, VA (US)

(73) Assignee: Jefferson Science Associates, LLC,
New Port News, VA (US)

( * ) Notice: Subject to any disclaimer, the term of this patent is extended or adjusted under 35 U.S.C. 154(b) by 0 days.

(21) Appl. No.: 12/386,917

(22) Filed: Apr. 24, 2009

(51) Int. Cl.
*G02B 9/00* (2006.01)
*G02B 27/30* (2006.01)

(52) U.S. Cl. ........................................ 359/796; 359/641

(58) Field of Classification Search .................. 359/796, 359/797, 641, 741, 710
See application file for complete search history.

(56) References Cited

U.S. PATENT DOCUMENTS

| 488,506 | A | * | 12/1892 | McIllwain | 359/399 |
|---|---|---|---|---|---|
| 5,706,140 | A | * | 1/1998 | Nishino et al. | 359/793 |
| 6,747,805 | B2 | * | 6/2004 | Sayag | 359/664 |
| 7,385,192 | B2 | * | 6/2008 | Haase et al. | 250/288 |
| 7,423,818 | B2 | * | 9/2008 | Hemenway et al. | 359/738 |
| 7,773,317 | B2 | * | 8/2010 | Duparre | 359/793 |
| 2007/0097523 | A1 | * | 5/2007 | Yamagata et al. | 359/797 |
| 2009/0279188 | A1 | * | 11/2009 | Do | 359/716 |
| 2010/0277785 | A1 | * | 11/2010 | Gluckstad | 359/238 |

* cited by examiner

*Primary Examiner* — Jordan Schwartz

(57) ABSTRACT

A single lens bullet-shaped laser beam shaper capable of redistributing an arbitrary beam profile into any desired output profile comprising a unitary lens comprising: a convex front input surface defining a focal point and a flat output portion at the focal point; and b) a cylindrical core portion having a flat input surface coincident with the flat output portion of the first input portion at the focal point and a convex rear output surface remote from the convex front input surface.

9 Claims, 8 Drawing Sheets

SINGLE LENS LASER BEAM SHAPER

The United States of America may have certain rights to this invention under Management and Operating Contract DE-AC05-06OR23177 from the United States Department of Energy.

FIELD OF THE INVENTION

The present invention relates to laser beam shaping lenses and more particularly to a single optical lens that converts Gaussian beams to super-Gaussian beams for suppression of uniformity destruction by diffraction effects.

BACKGROUND OF THE INVENTION

There is an increasing demand for laser beams with uniform intensity distribution for such applications as material processing, lithography, medical applications, laser printing, optical data storage, micromachining, isotope separation optical processing and a variety of laboratory applications. In particular, in the field of particle accelerators, laser beam shapers can be used in photon-injectors to provide a quasi-flat drive laser which then produces quasi-flat electron bunches whose emittance can be preserved along the beam line.

The basic principle of laser beam reshaping by a pair of aspheric lenses was proposed by Frieden (B. R. Frieden, "Lossless conversion of a plane laser wave to a plane wave of uniform irradiance," Appl. Opt. 4, 1400-1403 (1965)) and Kreuzer (J. L. Kreuzer, "Coherent light optical system yielding an output beam of desired intensity distribution at a desired equiphase surface," U.S. Pat. No. 3,476,463 (4 Nov. 1969), and later by Shealy and co-workers (P. Rhodes and D. Shealy, "Refractive optical systems for irradiance redistribution of collimated radiation: their design and analysis", Appl. Opt. 19, 3545-3553 (1980); C. Wang and D. L. Shealy, "Design of gradient-index lens systems for laser beam reshaping," Appl. Opt. 32, 4763-4769 (1993).

Since then, much has been done to optimize designs and experimental results (W. Jiang, D. L. Shealy, and J. C. Martin, "Design and testing of a refractive reshaping system," in Current Developments in Optical Design and Optical Engineering III, R. E. Fischer and W. J. Smith, eds., Proc. SPIE 2000, 64-75 (1993). W. Jiang and D. L. Shealy, "Development and testing of a laser beam shaping system," in Laser Beam Shaping, F. M. Dickey and S. C. Holswade, eds., Proc. SPIE 4095, 165-175 (2000). S. Zhang, "A simple bi-convex refractive laser beam shaper", J. Opt. A: Pure Appl. Opt. 9 945-950; J. A. Hoffnagle and C. M. Jefferson, "Beam shaping with a plano-aspheric lens pair," Opt. Eng. 42, 3090-3099 (2003).

According to the literature in this field, all refractive shaping systems can be divided into four types (C. Liu and S. Zhang, "Study of singular radius and surface boundary constraints in refractive beam shaper design," Opt. Express 16, 6675-6682 (2008); J. A. Hoffnagle and C. M. Jefferson, "Refractive optical system that converts a laser beam to a collimated flat-top beam," U.S. Pat. No. 6,295,168 (25 Sep. 2001); J. A. Hoffnagle and C. M. Jefferson, "Design and performance of a refractive optical system that converts a Gaussian to a flattop beam," Appl. Opt. 39, 5488-5499 (2000); S. Zhang, G. Neil, and M. Shinn, "Single-element laser beam shaper for uniform flat-top profiles," Opt. Express 14, 1942-1948 (2003); D. L. Shealy and J. A. Hoffnagle, "Laser beam shaping profiles and propagation," Appl. Opt. 45, 5118-5131 (2006); A. E. Siegman, Lasers, University Science. Type-1 is the conventional Galilean design, which can be considered as a Galilean telescope with radially varying magnification. The type-2 design of Keplerian, was proposed and patented by Hoffnagle and Jefferson J. A. (Hoffnagle and C. M. Jefferson, "Refractive optical system that converts a laser beam to a collimated flat-top beam," U.S. Pat. No. 6,295,168 (25 Sep. 2001); J. A. Hoffnagle and C. M. Jefferson, "Design and performance of a refractive optical system that converts a Gaussian to a flattop beam," Appl. Opt. 39, 5488-5499 (2000)).

Two convex surfaces are adopted in this system so the beam converges first and then diverges between two lenses. This configuration is most commonly used because it is easier to fabricate a convex surface than a concave surface. Shapers of type-3 and type-4 are concave-convex and convex-convex single lens shaping systems respectively. The analysis in S. Zhang, G. Neil, and M. Shinn, "Single-element laser beam shaper for uniform flat-top profiles," Opt. Express 14, 1942-1948 (2003) shows that a single lens shaper can be obtained by taking the alternative solution of his well-established differential equation. In a type-4 design, the first aspheric surface refracts and converges the input light beams inside the lens. The light rays toward the edge of the beam are bent at a bigger angle than those toward the center of the beam. All rays diverge from each other after the focal plane. The rays refract on the second surface again and get collimated. Referring to the work by Kreuzer, analysis of the design procedure for type-4 shaper produces a similar lucid sag expression which also applies to other types. It has now been determined that a shaper of any type can be designed by solving the sag expression numerically together with the Energy Conservation Law which is another essential condition for shaping systems. Usually, a round flat-top output profile with sharp edges is assumed when solving the differential equation. The sharp edges result in severe diffraction effects which lead to degradation of beam uniformity. With the new method to be presented in this paper, any flat-top or other output profile can be easily chosen. For example, diffraction effects can be effectively suppressed by selecting a continuous roll-off beam profile, like super-Gaussian. Here, the design of a new single lens shaper with two convex aspheric surfaces will be presented. Using convex surfaces reduces fabrication difficulty and allows for large apertures to suppress diffraction while the single element choice simplifies overall configuration and eases optical alignment. Most importantly, this new design converts a Gaussian laser beam to a super-Gaussian beam which alleviates severe diffraction effects and increases the working distance of the shaped output laser beam.

OBJECT OF THE INVENTION

It is therefore an object of the present invention to provide a single element laser beam shaper capable of redistributing an arbitrary beam profile into any a desired flattop output profile.

SUMMARY OF THE INVENTION

The present invention provides a single lens laser beam shaper capable of redistributing an arbitrary beam profile into a desired flattop output profile comprising a unitary lens comprising: a convex front input surface converges the beam to a focal point and thereafter the beam diverges; and b) a convex rear output surface converges the beam to be parallel to the axis and uniform transversely.

DESCRIPTION OF THE DRAWINGS

FIG. 2(a) is a schematic showing the single lens laser beam shaper of the present invention; (b) represents the input beam profile of FIG. 2(a); and (c) represents the output beam profile of FIG. 2(a).

DETAILED DESCRIPTION

Two conditions must be met for a shaping system: a) the output intensity must equal the input intensity, i.e. be consistent with energy conservation; and b) all rays must maintain the same optical path length (OPL). Combining condition b) and Snell's Law, an analytical expression for aspheric surfaces in terms of lens length s, shaper refractive index n, entrance radius $r_1$, and exit radius $r_2$ can be deduced as follows.

Figure 1:
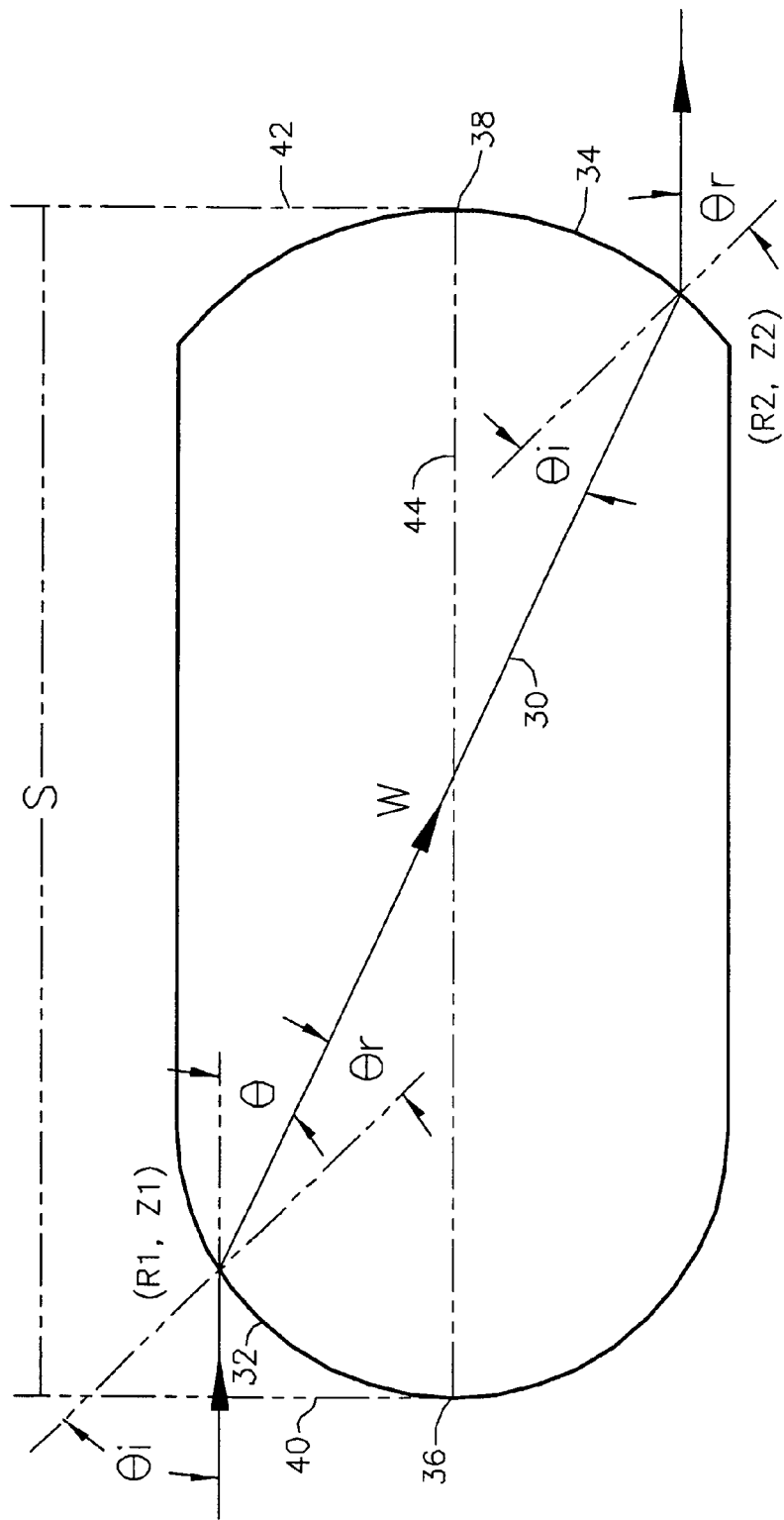
FIG. 1 is a geometric diagram of type-4 laser beam shaper.

An incident ray parallel to the optical axis, which is presented by the arrowed line 30 in FIG. 1, is intercepted at radius $r_1$ on the first surface 32 and is refracted to travel at an angle θ to the optical axis. When the ray reaches surface 34 at radius $r_2$, it is refracted again and emerges parallel to the optical axis 44. The distance between the two face apexes 36 and 38 is denoted by s. Two planes 40 and 42 which sit on those two vertexes 36 and 38 shown in FIG. 1 are perpendicular to the optical axis 44. The length of the path inside shaper that the ray takes is denoted by W.

Applying geometric principles, $$r_1 + r_2 = W\sin(\theta). \tag{1}$$

Let p(r) be the OPL between the two planes. For the ray shown above, $$p(r) = (S - W\cos\theta) + nW. \tag{2}$$

The first term on the right side of this equation is the optical path in air. The second term is the optical path in glass. Provided that $$p(r) = p(0) \tag{3}$$

the optical path between the two planes will be equal for all rays. p(0) is the optical path on axis between the two planes:

$$p(0) = nS \tag{4}$$

Combining equations (2) and (4), $$(S - W\cos\theta) + nW = nS. \tag{5}$$

According to Snell's law, $$\sin(\theta_i) = n \sin(\theta_r). \tag{6}$$

As shown in FIG. 1, $$\theta_i = \theta_r + \theta. \tag{7}$$

The angle $\theta_i$ is the respective slope of the two surfaces at $r_1$ and $r_2$. So, $$\tan(\theta_i) = \frac{d}{dr_1} Z_1(r_1) \tag{8}$$

$$\tan(\theta_i) = \frac{d}{dr_2} Z_1(r_2). \tag{9}$$

Combining (6) and (7) to eliminate $\theta_r$, $$\tan(\theta_i) = \frac{n\sin(\theta)}{n\cos\theta - 1}. \tag{10}$$

(1) and (5) can be combined to yield:

$$\frac{n - \cos\theta}{\sin\theta} = \frac{(n-1)S}{r_1 + r_2} = u. \tag{11}$$

Here, u is just a convenient notation. With (10) and (11), we can get an expression for the slope of surface in terms of n, s, $r_1$, $r_2$:

$$\tan\theta_i = \sqrt{\frac{n^2}{u^2 - n^2 + 1}} = n\left\{\left[\frac{(n-1)S}{r_1 + r_2}\right]^2 - n^2 + 1\right\}^{-1/2}. \tag{12}$$

This can be used in (8) and (9) to get a lucid analytical sag expression for both surfaces of a type-4 single lens shaping system, $$Z_1(r) = \int_0^r n\left[-(n^2 - 1) + \left(\frac{(n-1)S}{r_2 + r_1}\right)^2\right]^{-1/2} dr_1 \tag{13}$$

$$Z_2(r) = \int_0^r n\left[-(n^2 - 1) + \left(\frac{(n-1)S}{r_2 + r_1}\right)^2\right]^{-1/2} dr_2. \tag{14}$$

The same analysis procedure also holds for the other designs. The design of a type-3 shaper can be accomplished with the aid of the foregoing equations by replacing $r_2$ with $-r_2$. By replacing n with 1/n, we can get the sag expression for type-2 design. Not surprisingly, the same equations as in D. L. Shealy and J. A. Hoffnagle, "Laser beam shaping profiles and propagation," Appl. Opt. 45, 5118-5131 (2006) are obtained by replacing $r_2$ with $-r_2$ and n with 1/n.

Next, assume the system is rotationally symmetric, and the intensity of the input beam at radius r is represented by the function $f(r)$. Usually, the input profile of greatest interest is the Gaussian profile which is a good representation of a $TEM_{00}$ laser beam.

$$f(r) = (2/\pi\omega_0^2)\exp(-2r^2/\omega_0^2). \tag{15}$$

where, $\omega_0$ is the beam size parameter. The output profile is chosen to be a super-Gaussian distribution of order P:

$$g(r) = g_0 \exp(-2(r/R)^P) \tag{16}$$

with $$g_0 = \frac{2^{2/P} P}{2\pi R^2 \Gamma(2/P)}. \tag{17}$$

It follows from energy conservation law that $$2\pi \int_0^{r_1} f(r) r \, dr = 2\pi \int_0^{r_2} g(r) r \, dr. \tag{18}$$

With (18), (13) and (14) can be solved numerically to define the two surfaces much more easily than directly solving the complicated differential equations described by S. Zhang, G. Neil, and M. Shinn, "Single-element laser beam shaper for uniform flat-top profiles," Opt. Express 14, 1942-

1948 (2003). This can be generalized to any other shaper type and for any input (output) beam. The output spot size can be conveniently adjusted by changing parameter R in (16) which is approximately the radius of super-Gaussian flattop profile. Also, the slope of the ramp of the continuous roll-off output profile can be set according to any special needs by controlling order parameter P.

To verify the theory illustrated above, a single lens shaper with an aperture (5.7 mm) about three times the input beam size has been designed. At the edge, the intensity is reduced by a factor of $10^{-7}$ from its peak on axis. It redistributes a Gaussian beam with a 2 mm radius to a super-Gaussian beam with parameters, R=6 mm, P=12. The length of the shaper is chosen to be 30 mm, and BK7 glass with index of refraction n=1.51947 at $\lambda$=532 nm is used.

Figure 2A:
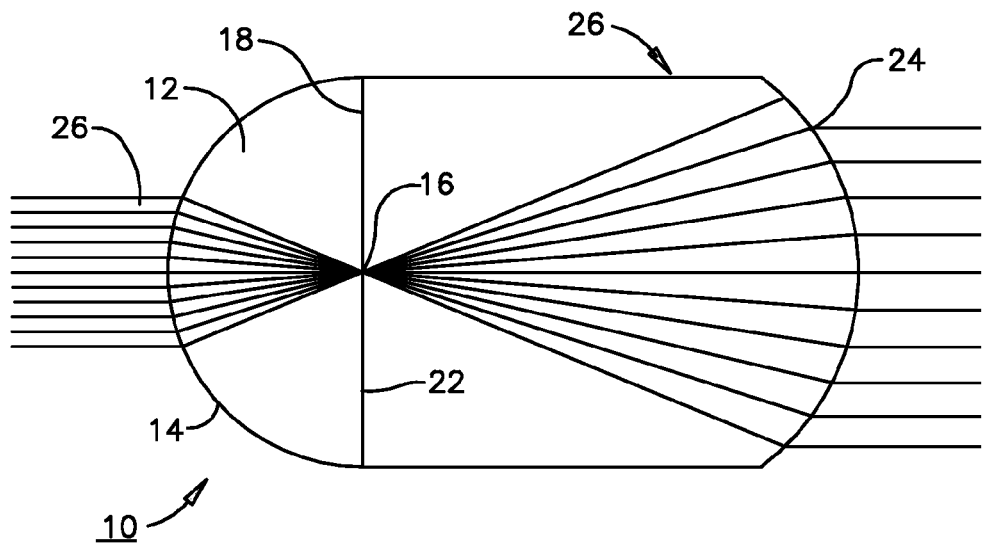
FIGS. 2(a) through 2(c) are ray tracing diagrams of the laser beam shaper of the present invention.
Figure 6:
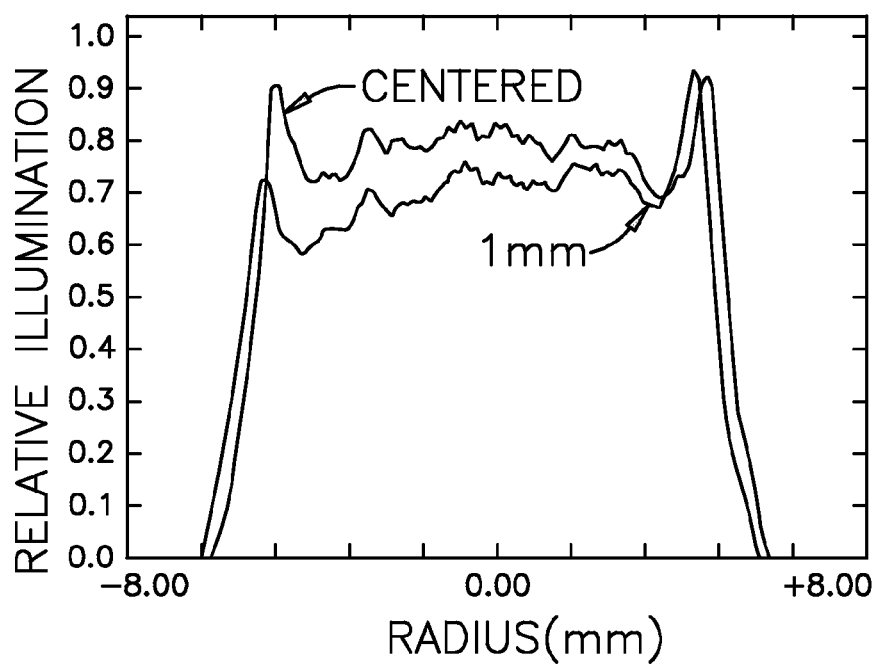
FIG. 6 shows the output beam 200 mm after the shaper with input beam 0.1 mm displaced from center.
Figure 2B:
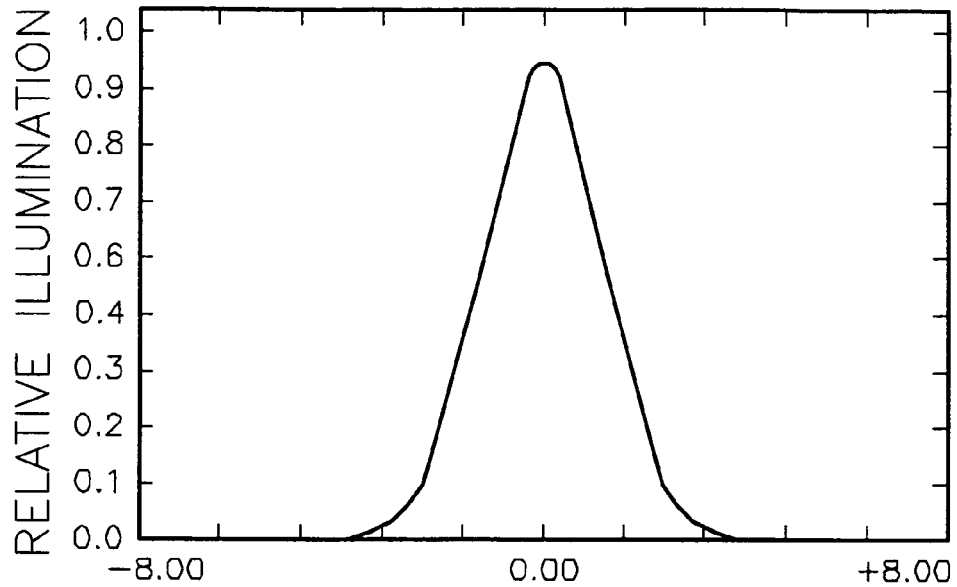
Figure 2C:
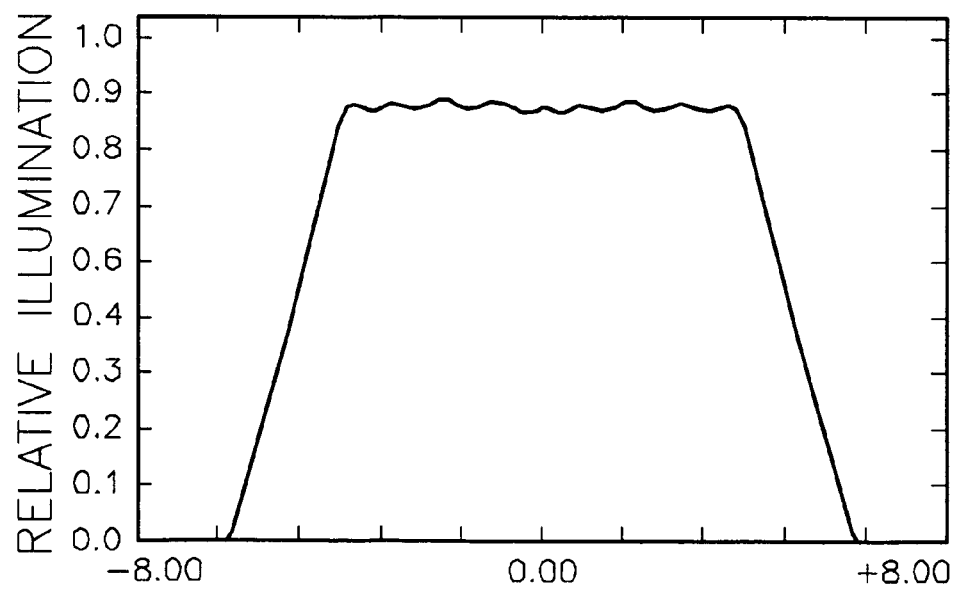

The front surface of the shaper redistributes the beam profile and the rear surface recollimates the light rays in the way described above. As expected, a super-Gaussian beam with a pretty wide (6 mm) flat top in the center comes out at the exit. Also presented are the input and output geometric images. Such a unitary beam shaper is depicted schematically in FIG. 2(a) wherein unitary single lens beam shaper 10 comprises a convex front surface redistributing the input beam profile and a convex rear output surface recollimating the light rays to be parallel to the axis and uniform distributed in transverse. Arbitrary input laser generated rays 26 impact front convex input surface 14, are bent in accordance with the analysis described herein, focused at focal point 16 and diffuse to straight parallel lines again in accordance with the formulae described herein and exit convex rear output surface 24 in a predetermined profile, again, as determined using the formulas described herein for defining the curvature of front convex input surface 14 and rear convex output surface 24.

Figure 3A:
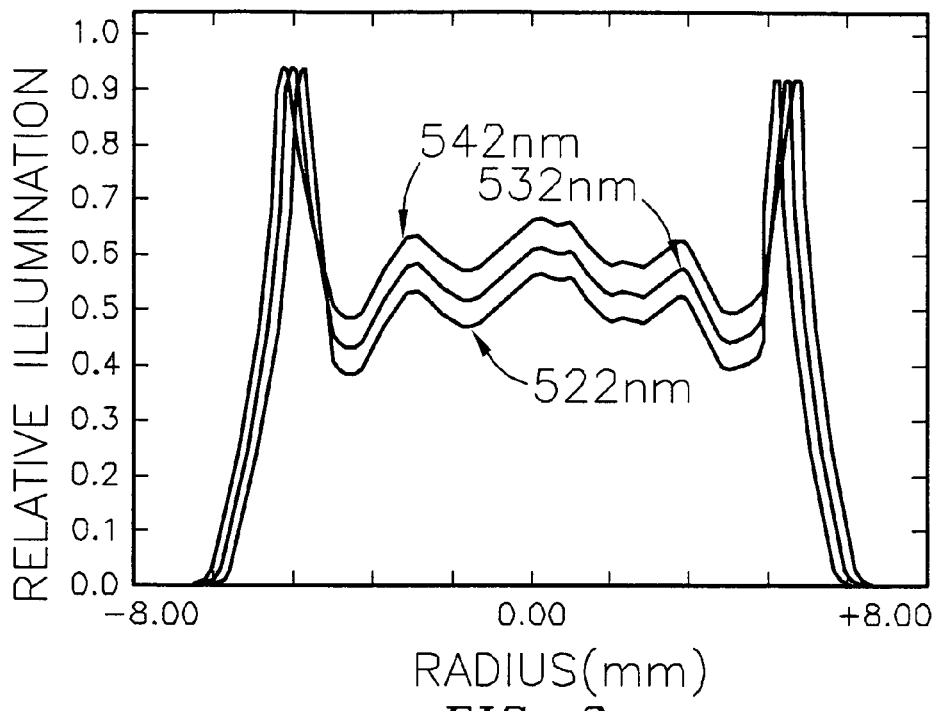
FIGS. 3 (a) and (b) demonstrate wavelength dependence: (a) output profiles at 300 mm for different wavelengths; and (b) output at 300 mm for a multi-wavelength source.
Figure 3B:
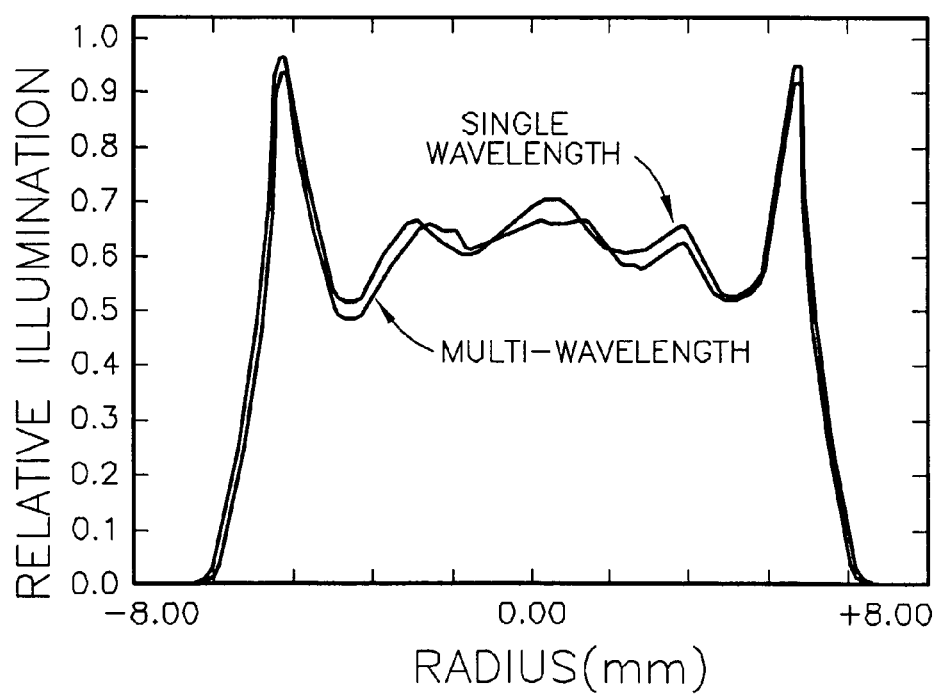

The first parameter which affects the output beam that needs to be examined is the wavelength. Since the shaper is designed specifically for 532 nm, degraded performance is expected for different wavelengths. It turns out that the outputs are almost the same right after the shaper for wavelengths in a reasonable range (532±10 nm). Therefore, beam profiles indicating the degradation for different wavelengths after 300 mm propagation are shown in FIG. 3 (a). Despite the protuberant edges, the center parts (also main parts) of those profiles maintain good uniformity at a considerable working distance. For applications demanding high uniformity, the requirement can be met by eliminating the undesirable edges with a round aperture. In practice, the input laser is not strictly monochrome but has a certain bandwidth. It is also useful to check the impact of multi-wavelength sources. Three wavelength components (522 nm, 532 nm, 542 nm) with the same intensity are assumed in simulation. The outputs are almost the same for the single wavelength input and input with multi-wavelength components. Therefore, it is a reliable design with excellent wavelength acceptance.

Figure 4:
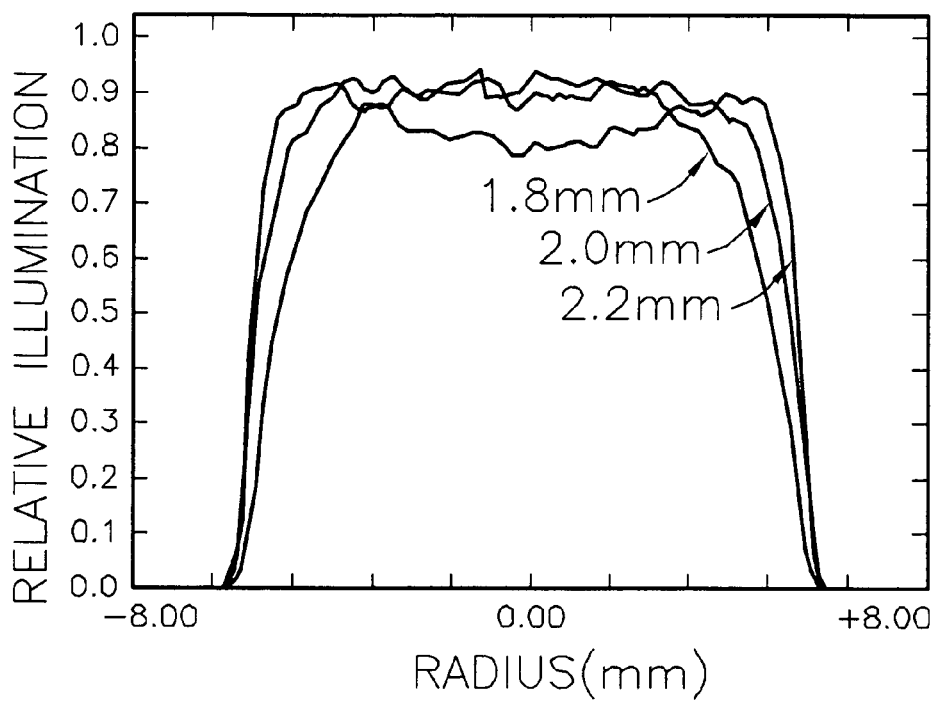
FIG. 4 is a graph depicting the output for different input radii: 1.8 mm, 2.0 mm and 2.2 mm.
Figure 5:
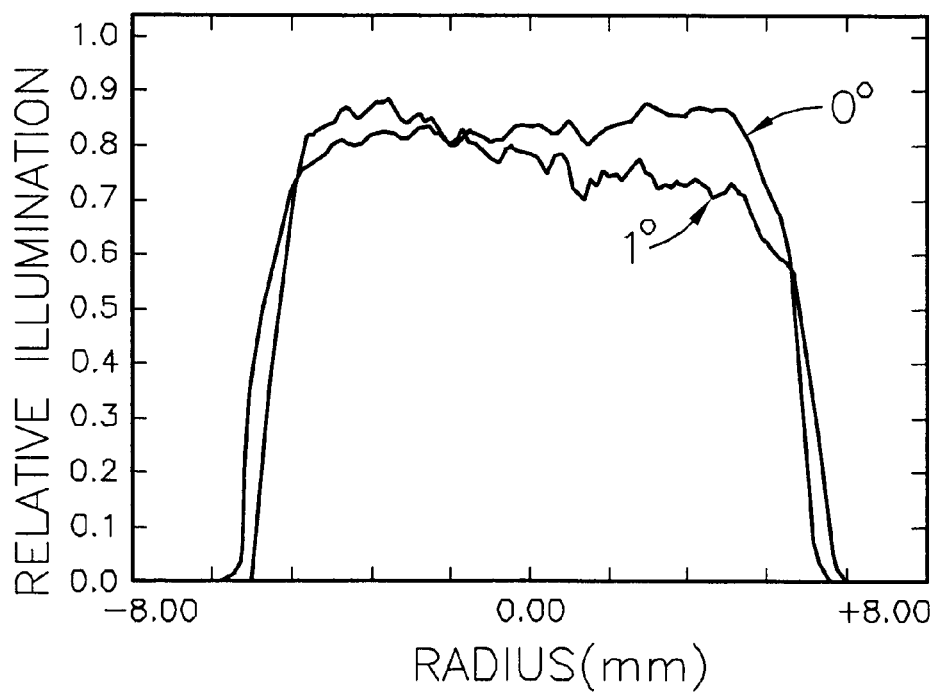
FIG. 5 is a graph depicting the output of 1° tilted input beam and normal incident beam.
Figure 7A:
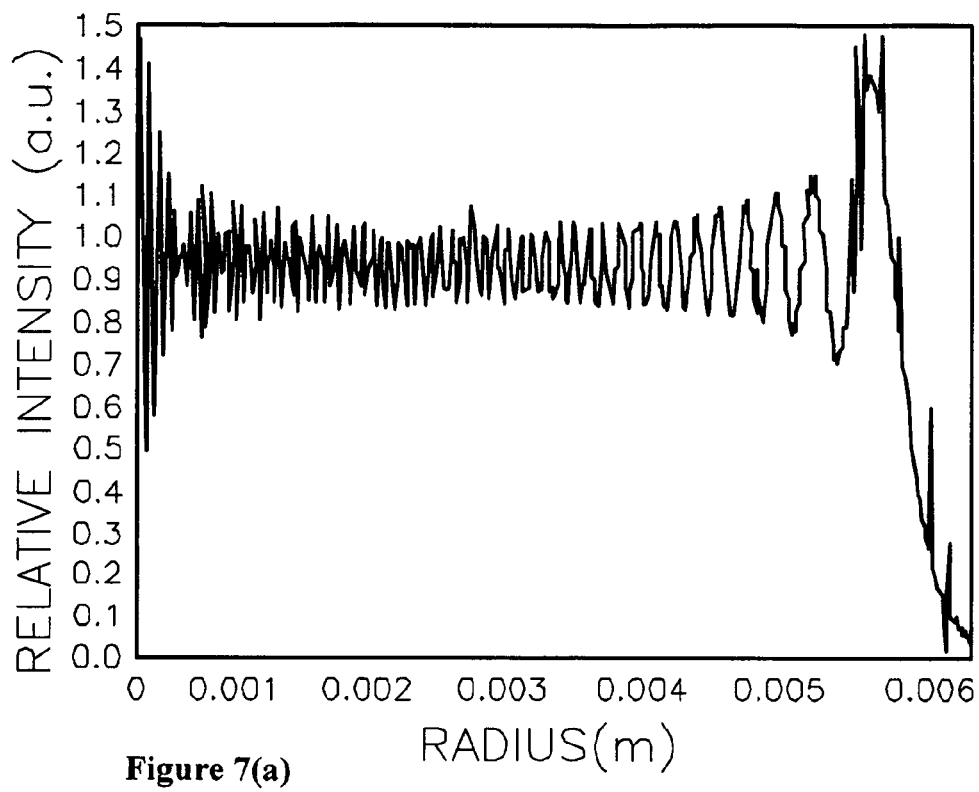
FIGS. 7 (a-f) depict diffraction patterns at different propagation distances for a 5.7 mm shaper in the case of sharp edge flat-top beam (a) 0.5 m, (c) 1 m, (e) 2 m; In case of super-Gaussian, (b) 0.5 m, (d) 1 m, (f) 2 m.
Figure 7B:
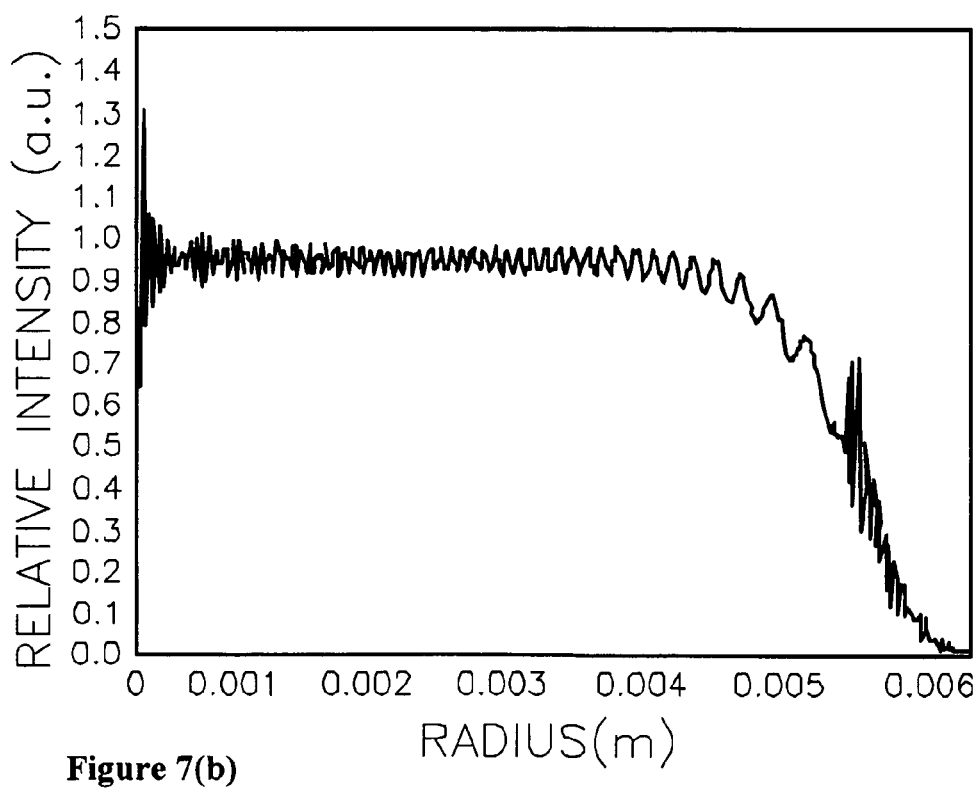
Figure 7C:
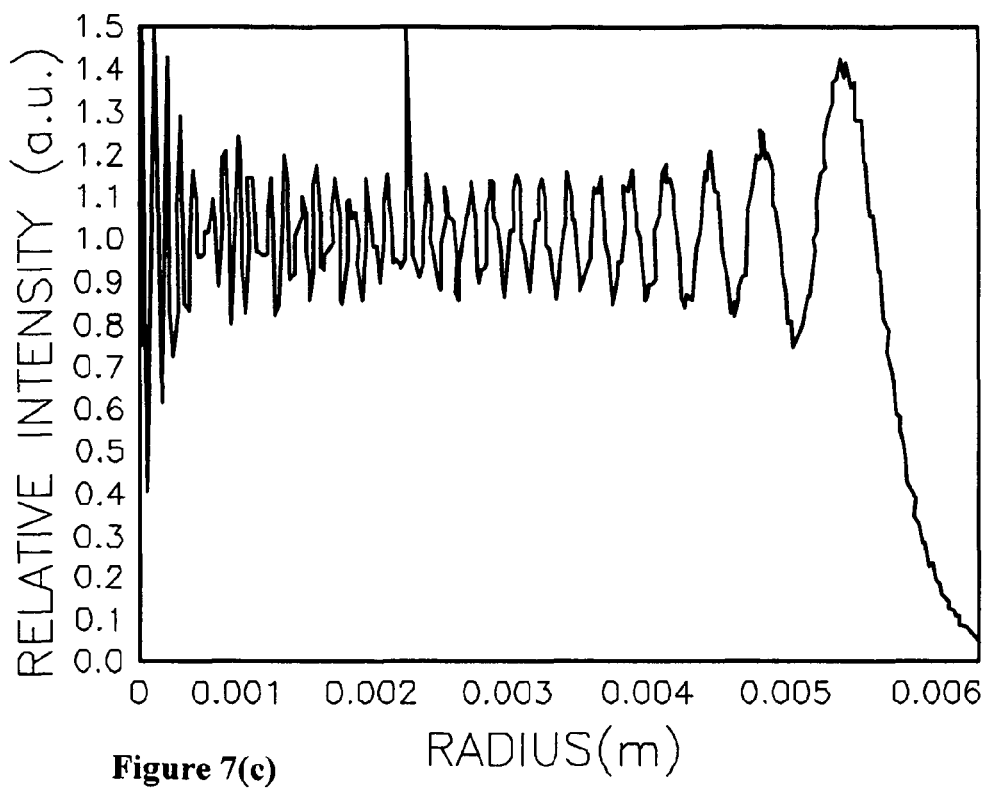
Figure 7D:
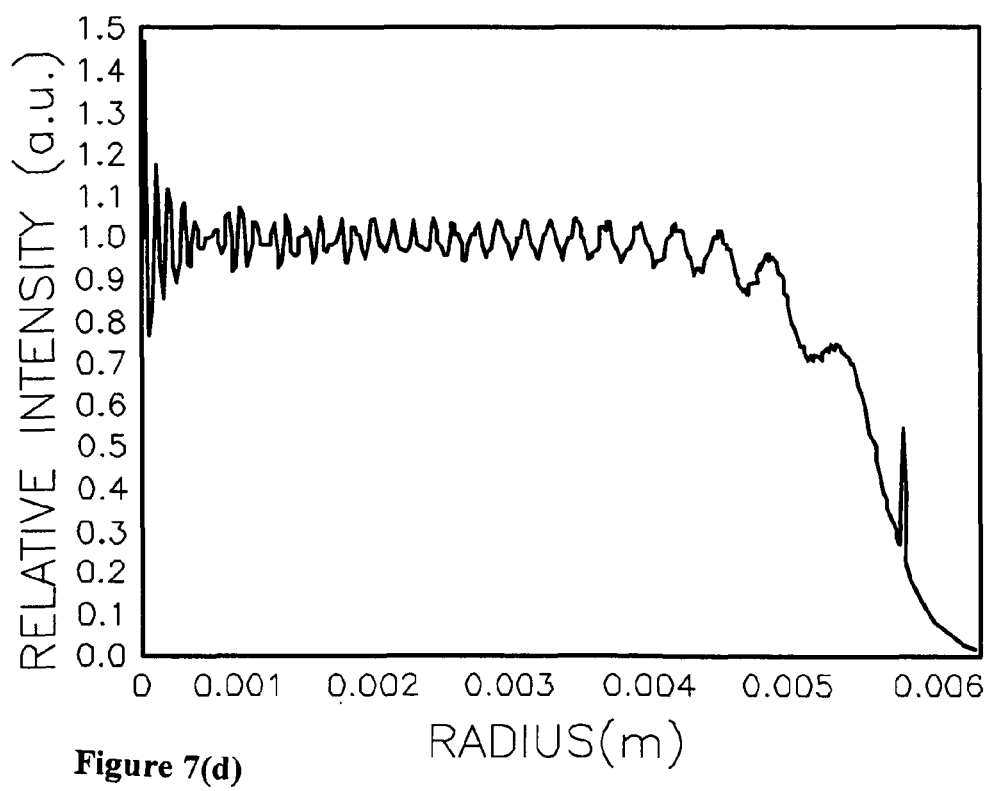
Figure 7E:
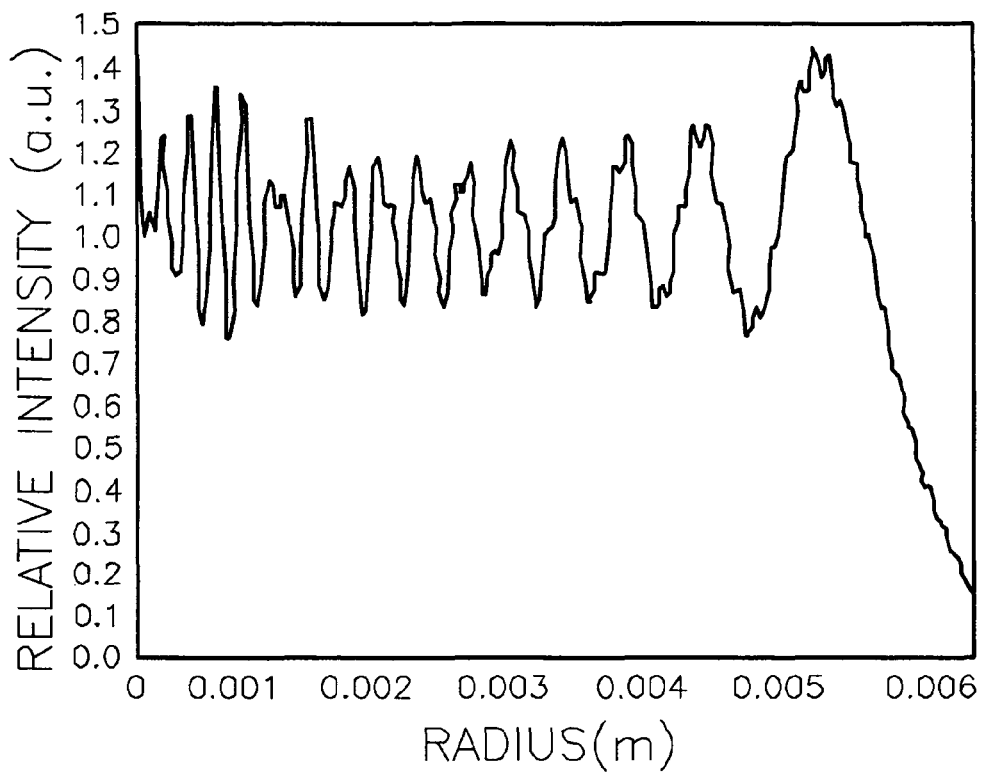
Figure 7F:
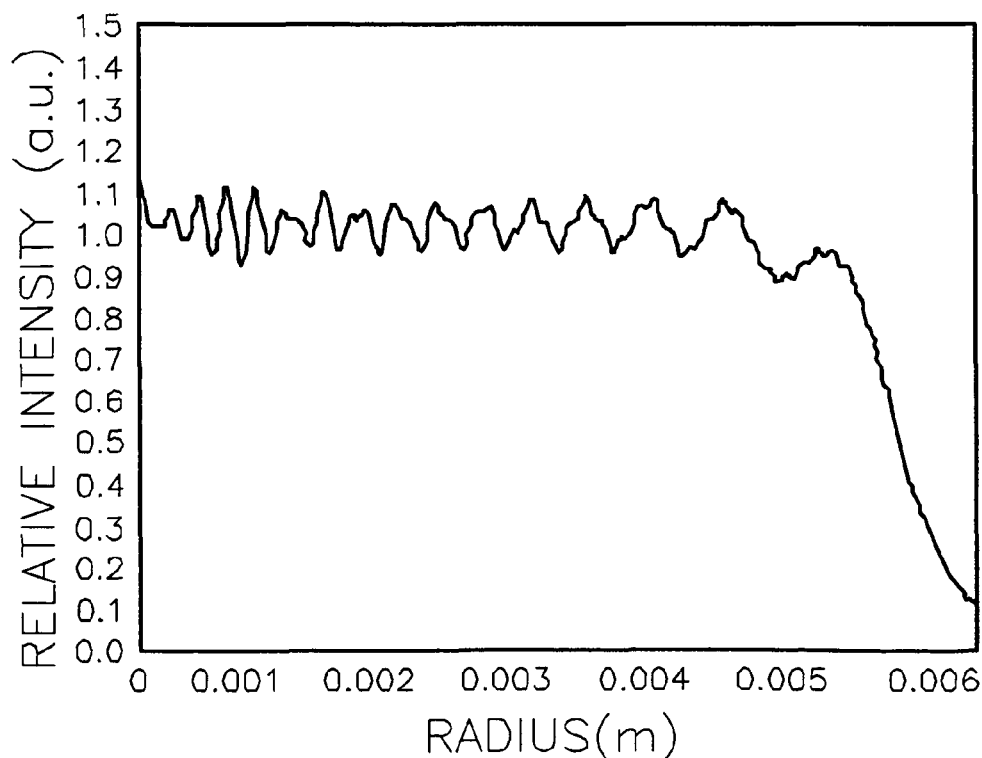

The laser beam profile on the front surface of the shaper is not necessarily a Gaussian function as we assumed, so it is necessary to check the effects of variation in the input beam intensity profile. The variation of intensity can be introduced in two different ways: the input laser profile is not the same Gaussian as designed (or not Gaussian at all), or errors in the shaping system alignment cause distortion. The second case is examined below. Here, the input profile is changed simply by varying beam size by +/−10%, and non-uniform irradiance out of the exit pupil is shown in FIG. 4 as expected. However, the output beam will still emerge from the shaper parallel to the axis, and each ray will go through equal OPL. As proposed in S. Zhang, "A simple bi-convex refractive laser beam shaper", *J. Opt. A: Pure Appl. Opt.* 9 945-950, the "bulging" profile that results from using a longer wavelength may be "flattened" by choosing a bigger input beam size.

It is assumed that the input beam is rotationally symmetric with respect to the optical axis of the shaper, and the rays travel parallel to the axis. However, the shaping system could be misaligned and result in a non-Gaussian distribution. Any displacement of the input beam or any off-axis input beam angle will cause a non-ideal output result.

Comparing the results from the above analysis, we can see that the shaper is more sensitive to input profile variation, independent of the cause. Checking some of the other similar analysis described by: W. Jiang and D. L. Shealy, "Development and testing of a laser beam shaping system," in Laser Beam Shaping, F. M. Dickey and S. C. Holswade, eds., *Proc. SPIE* 4095, 165-175 (2000); and S. Zhang, "A simple bi-convex refractive laser beam shaper", *J. Opt. A: Pure Appl. Opt.* 9 945-950 shows this holds for all refractive shaping systems. From this, the importance of good alignment to a shaping system is clear and is the incentive for using a single lens shaper design since it alleviates the need for complicated alignment procedures inherent to two-lens or multi-lens shaping systems.

As described above, the main reason for designing a super-Gaussian shaper is to minimize the destructive effects on profile uniformity caused by diffraction as the beam propagates. This is the sole advantage of a super-Gaussian shaper over the pure flat top type with a sharp edge. To resolve this issue, it is necessary to perform physical optical propagation instead of only using the geometric optical model as described above.

Assuming that the output beam from the shaper is a plane wave and the effect of diffraction on the propagating beam for both super-Gaussian and flat-top is calculated. A cylindrically symmetrical beam shaper is considered as a circular aperture for simplicity. A circular aperture of diameter $2a$ is located at the rear surface of beam shaper. The field amplitude of the beam shaper output is denoted as $u_0(r_0)$. After propagating a distance D, the field amplitude can be given by the Fresnel-Kirchhoff integral described in. E. Siegman, Lasers, University Science Books, 1986, Sec. 18.4 as $$u(r) = i2\pi N e^{-i\pi N(\frac{r}{a})^2} \int_0^1 \frac{r_0 u_0(r_0) e^{-i\pi N(\frac{r_0}{a})^2}}{a} * J_0\left(\frac{2\pi N r_0 r}{a^2}\right) d\left(\frac{r_0}{a}\right) \quad (19)$$

where $J_0$ is the Bessel function of order 0, the phase term doesn't affect the intensity calculation, and the Fresnel number N for the circular aperture is defined as $$N = \frac{a^2}{D\lambda}. \quad (20)$$

In the case of the beam shaper, the radius a is in the vicinity of several mm, so the distance D is the dominating term in the Fresnel number for a certain wavelength. The n field diffraction pattern is more important than the far field pattern since the Airy disk pattern of far field diffraction is not desirable for a beam shaper. The near field diffraction pattern of a circular aperture has approximately N large-amplitude Fresnel ripples across the full width of the beam, and these larger fringes are then modulated by many smaller-amplitude but higher-frequency Fresnel ripples on top of them as described by Siegman. In order to keep the quasi-flat profile, the Fresnel number N should not be too small, which means the distance D the beam can propagate without substantial profile change is limited. For example, in our case λ=532 nm, α=5.7 mm, the distance D can not exceed 3m in order to keep N bigger than 20.

It is straightforward to evaluate (19) numerically. Some of the diffracted patterns are displayed for our case, and results for a flat top are shown as well for comparison. The diffraction patterns are the same as expected: a top-hat modulated by a series of circular rings as depicted in FIGS. 7 (a-f). However, the amplitudes of the ripples in the super-Gaussian case are obviously smaller than those in the flat top cases. The quasi-flat top profile can be preserved much better along the propagation path. Diffraction can be further reduced by choosing a rounder output beam, which means smaller order P for a super-Gaussian profile.

As the invention has been described, it will be apparent to those skilled in the art that the same may be varied in many ways without departing from the spirit and scope of the invention. Any and all such modifications are intended to be included within the scope of the appended claims.

What is claimed is:

1. A lens laser beam shaper capable of redistributing an arbitrary beam profile into a desired output profile comprising a unitary lens having:
   a) a convex front input surface defining a focal point after which the beam diverges;
   b) a convex rear output surface redistributing the beam to a desired flattop profile and collimating the beam; and
   c) an essentially cylindrical core portion interposed between said input surface and said output surface wherein the lens is in the form of a single integral structure.

2. The lens laser beam shaper of claim 1 wherein the configuration of the convex front input surface and the convex rear output surface which redistribute an arbitrary beam profile into a desired output profile are defined by the following formulas:

$$Z_1(r) = \int_0^r n\left[-(n^2-1) + \left(\frac{(n-1)S}{r_2+r_1}\right)^2\right]^{-1/2} dr_1;$$

$$Z_2(r) = \int_0^r n\left[-(n^2-1) + \left(\frac{(n-1)S}{r_2+r_1}\right)^2\right]^{-1/2} dr_2; \text{ and}$$

$$2\pi\int_0^{r_1} f(r)r\,dr = 2\pi\int_0^{r_2} g(r)r\,dr$$

wherein s represents lens length, n represents shaper refractive index, $r_1$ represents input surface radius, and $r_2$ represents output surface radius.

3. The lens laser beam shaper of claim 1 wherein substantially collimated input rays emerge from the lens laser beam shaper as substantially collimated output rays.

4. A lens laser beam shaper capable of manipulating a laser beam comprising:
   a) a convex front input surface disposed to receive said beam and converging said beam such that a focal point is defined after which said beam diverges; and
   b) a convex rear output surface redistributing said beam to a desired flattop profile and collimating said beam wherein the lens is in the form of a single integral structure.

5. The lens laser beam shaper of claim 4 wherein said beam includes input light rays and output light rays and said converging said beam comprises converging said input light rays.

6. The lens laser beam shaper of claim 5 wherein substantially collimated input light rays emerge from the single lens beam shaper as substantially collimated output rays.

7. The lens laser beam shaper of claim 6 wherein the configuration of the convex front input surface and the convex rear output surface which redistribute an arbitrary beam profile into a desired output profile are defined by the following formulas:

$$Z_1(r) = \int_0^r n\left[-(n^2-1) + \left(\frac{(n-1)S}{r_2+r_1}\right)^2\right]^{-1/2} dr_1;$$

$$Z_2(r) = \int_0^r n\left[-(n^2-1) + \left(\frac{(n-1)S}{r_2+r_1}\right)^2\right]^{-1/2} dr_2; \text{ and}$$

$$2\pi\int_0^{r_1} f(r)r\,dr = 2\pi\int_0^{r_2} g(r)r\,dr$$

wherein s represents lens length, n represents shaper refractive index, $r_1$ represents input surface radius, and $r_2$ represents output surface radius.

8. The lens laser beam shaper of claim 4 wherein said input surface curves and said output surface curves are such that said beam shaper is able to convert a Gaussian beam profile to a super-Gaussian beam profile.

9. A lens laser beam shaper capable of redistributing an arbitrary beam profile into a desired output profile comprising a unitary lens having:
   a) a convex front input lens portion having a convex front input surface defining a focal point and a flat output surface at the focal point; and
   b) a cylindrical core portion having a flat input surface at the focal point and a convex rear output surface remote from the convex front input lens portion,
   wherein the configuration of the convex front input surface and the convex rear output surface which redistribute an arbitrary beam profile into a desired output profile are defined by the following formulas:

$$Z_1(r) = \int_0^r n\left[-(n^2-1) + \left(\frac{(n-1)S}{r_2+r_1}\right)^2\right]^{-1/2} dr_1;$$

$$Z_2(r) = \int_0^r n\left[-(n^2-1) + \left(\frac{(n-1)S}{r_2+r_1}\right)^2\right]^{-1/2} dr_2; \text{ and}$$

$$2\pi\int_0^{r_1} f(r)r\,dr = 2\pi\int_0^{r_2} g(r)r\,dr$$

wherein the lens is in the form of a single integral structure and wherein s represents lens length, n represents beam shaper refractive index, $r_1$ represents input surface radius, and $r_2$ represents output surface radius.

* * * * *